(12) United States Patent
Sathyanarayana et al.

(10) Patent No.: US 8,676,731 B1
(45) Date of Patent: Mar. 18, 2014

(54) DATA EXTRACTION CONFIDENCE ATTRIBUTE WITH TRANSFORMATIONS

(75) Inventors: Vinaya Sathyanarayana, Bangalore (IN); Peeta Basa Pati, Bangalore (IN); Salaka Sivananda, Bangalore (IN); Rajarajan T. R., Bangalore (IN)

(73) Assignee: CoreLogic, Inc., Santa Ana, CA (US)

( * ) Notice: Subject to any disclaimer, the term of this patent is extended or adjusted under 35 U.S.C. 154(b) by 259 days.

(21) Appl. No.: 13/180,068

(22) Filed: Jul. 11, 2011

(51) Int. Cl.
*G06F 15/18* (2006.01)

(52) U.S. Cl.
USPC .......................................................... 706/12

(58) Field of Classification Search
None
See application file for complete search history.

(56) References Cited

U.S. PATENT DOCUMENTS

2005/0289182 A1* 12/2005 Pandian et al. ............ 707/104.1

OTHER PUBLICATIONS

Jin et al. "Off-line Chinese Handwriting Recognition using Multi-stage Neural Network Architecture", IEEE ICNN, 1995, pp. 6.*

* cited by examiner

*Primary Examiner* — Li-Wu Chang
(74) *Attorney, Agent, or Firm* — Monument IP Law Group (57) ABSTRACT

A data extraction system for receiving and scanning documents to generate ordered input for storage in a database employs a non-linear statistical model for a data extraction sequence having a plurality of transformations. Each transformation transitions an extracted data value in various forms from a raw data image to a computed data value. For each transformation, a confidence model learns a confidence component for the particular transformation. The learned confidence components, generated from a control set of documents having known values, are employed in a production mode with actual raw data. The confidence component corresponds to a likelihood of transformation accuracy, and the confidence model aggregates the confidence components to compute a confidence for the extracted data value. A database stores the extracted data value labeled with the computed confidence attribute for subsequent use by an application employing the extracted data.

28 Claims, 9 Drawing Sheets

DATA EXTRACTION CONFIDENCE ATTRIBUTE WITH TRANSFORMATIONS

BACKGROUND

Computer data entry techniques have traditionally been employed for converting volumes of hardcopy (paper based) data into electronic form for database storage and retrieval. In a conventional approach, data entry operators manually enter data fields from paper forms, typically by manually keying in text and numeric values to match the printed or hand printed or hand written version. As the forms often contain formatting or other extraneous and repetitive information in addition to salient data, such data entry operators are typically trained for particular types of forms having relevant fields in predetermined locations. In a typical data entry environment, such as a corporation processing incoming payments or invoices, for example, the volume of paper documents may be substantial. Accordingly, manual entry and verification of the data values is required as factors such as operator fatigue, inaccuracy and unfamiliarity can affect performance and accuracy of the resulting manually keyed data values.

SUMMARY

In a data entry and extraction environment for identifying and interpreting data values from documents, a data extraction system or mechanism receives and scans documents to generate ordered input for storage in a database or similar repository. Data extraction purports to intelligently analyze the raw data from a scanned image form and identify meaningful values through positioning, formatting, and other artifacts in the printed document that tend to indicate the salient data items. The scanned data items are transformed into corresponding data values in a normalized form (i.e. identified and labeled as data fields and values) for entry into a database, typically through a series of transitions from one form to another.

In a conventional data extraction process, such data is generally required to undergo a thorough human verification/validation mechanism to ensure the highest standards of quality to suit appropriate business expectations. In modern business scenarios, such paper documents are typically scanned and electronic copies are created for easy sharing and usage. Thus, it may be necessary to capture the data from scanned image copies and/or from documents that exist in editable text or equivalent forms. Conventional solutions deliver data either as-is or with appropriate transformation rules as applicable. However, the conventional solutions typically substitute for a mere portion of the manual keying-in effort. The proposed method not only captures data automatically from documents, it also delivers a measure of confidence, or score, associated with each captured data item. This confidence score may be used to reduce the effort of verification in an intelligent manner for further reduction in human efforts for data capture.

Configurations herein employ a non-linear statistical model for a data extraction sequence having a plurality of transformations. Each transformation transitions an extracted data value in various forms from a raw data image to a computed data value. For each transformation, a confidence model learns a confidence component for the particular transformation. The learned confidence components, generated from a control set of documents having known values, are employed in a production mode with actual raw data. The confidence component corresponds to a likelihood of transformation accuracy, and the confidence model aggregates the confidence components to compute a final confidence for the extracted data value. A database stores the extracted data value labeled with the computed confidence for subsequent use by an application employing the extracted data.

Configurations herein are based, in part, on the observation that conventional data extraction techniques are prone to misinterpretation of data values, yet do not provide an indication of reliability or likelihood of misinterpretation of the extracted data items. Accordingly, conventional automated data extraction approaches suffer from the shortcoming that inaccurate data values are received and processed as accurate, and therefore need rely on manual inspection and/or reentry when an extracted data value is found to be inaccurate. Shortcomings in the conventional extraction sequence, therefore, identify only an incorrect end result, and do not account for variance in fidelity of the underlying transforms (e.g. errors induced by OCR due to incorrect recognitions).

Configurations herein substantially overcome the shortcomings of conventional data extraction by defining a confidence model representative of each transform encountered by an extracted data item, identifying a component confidence for each transform, aggregating the component confidences into a final confidence for the extracted data value, and storing the data value with the final confidence for subsequent consideration of the likelihood of accurate representation. The final confidence is employed with the corresponding data value to permit inspection and further reporting based on a sensitivity to inconsistencies of the usage context. Certain computation and/or reporting contexts may demand almost 100% certainty of the extracted data item, while others may tolerate a less than 100% accuracy, for example, in lieu of manual inspection of each data item and business need. Association of the data item with the corresponding confidence value allows subsequent processing to proceed in view of an accepted confidence threshold.

In further detail, in the configurations discussed below, in a data entry environment having a set of documents receivable as a stream of data responsive to automated data extraction, a data capture server performs method for evaluating confidence of an automatically captured data value by learning, from a set of input documents, component confidences of a data item, and builds a statistically derived confidence model, indicative of a relative weight of each of the component confidences toward a final confidence representative of each of the component confidences. A production phase labels an extracted data item with a confidence attribute indicative of the final confidence, and storing the extracted data item and labeled confidence attribute in a corresponding field in a database.

Alternate configurations of the invention include a multi-programming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a non-transitory computer-readable storage medium including computer program logic encoded as instructions thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM, RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Depicted below is an example configuration of data extraction from a document set. As the nature and types of data representation will vary from implementation to implementation, the disclosed approach should be taken as illustrative; various changes in scope and form may be applied, such as to alternately formatted documents, or variations in consistency between the document set provided. In general, a document set provides raw data from which the locations of the data items is learned in a training phase, and then the learned positions of the data items employed in a production phase for extracting the data items from "live" (non-control set) data. During learning, component confidences for each transformation are derived from sampling the input data and comparing the result to the known control set of actual values. The component confidences resulting from the sampling are retained for each transformation and applied to the live data for computing and storing the confidence attribute with the data item to which it corresponds.

Figure 1:
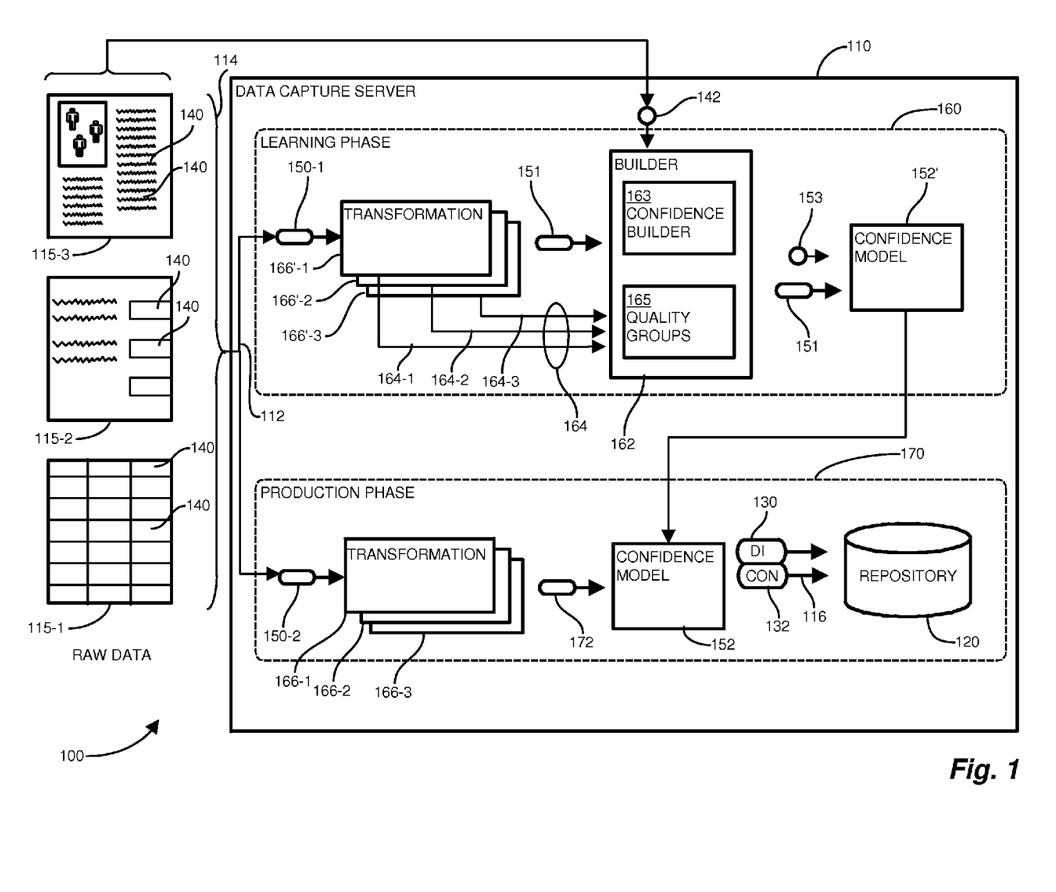
FIG. 1 is a context diagram of a data extraction environment suitable for use with configurations disclosed herein.

FIG. 1 is a context diagram of a data extraction environment 100 suitable for use with configurations disclosed herein. Referring to FIG. 1, the environment 100 includes a data capture server 110 having an interface 112 for receiving a document set 114 and an interface 116 to a repository 120 for storing extracted data items 130 along with the corresponding confidence attribute 132. The document set 114 includes different types 115-1 . . . 115-3 of documents as defined by formatting and placement of data items and other printed matter. A tabular type of document 115-1 includes embedded fields 140 of data values 150 in a tabular manner aligned as rows and columns. Another form type 115-2 includes positionally specific embedded fields 140 arranged in a consistent location on a page, and may be interspersed with header and other extraneous text. An arbitrary free-flow type 115-3 includes interspersed text and graphics such as images with embedded fields identifiable by context from surrounding words and/or images.

The data capture server 110 employs two modes of operation, a learning phase 160 and a production phase 170. The learning phase 160 receives a training set of raw data for identifying the types 115 of documents and the embedded field 140 location and/or context, and is accompanied by a control set of known values 142 corresponding to the data items 150-1 in the documents 115. Data extraction in any document includes multiple transformations 166'-1 . . . 166'-2 from printed input to the output data item 151. Each scanned or input data item 150-1 undergoes a series of transformations ultimately resulting in an extracted data item 151. A match indicator value 153 indicates if the extracted data item matched a corresponding value in the control data set 142. The control data set values 142 contain manually (i.e. human operator entered) captured data elements from images, and represents the certified final transformation output. Match comparison 153 is performed only with extracted data 151 against the control data 142 and not for any intermediate module outputs. For example, in 100 Mortgage documents, for which the server 110 capture 3 data fields from each of the mortgage documents. This amounts to capture of 300 data values from the batch of 100 documents. In generating the control set values 142, a human operator would manually enter only the values from the 100 documents, and need not type the whole text of all documents, but only the 300 data values, referred to as control data because it is assumed correct.

For every extracted data item 151, a transformation 166' generates a component confidence 164 indicative of the likelihood its accuracy. A builder 162 receives component confidences 164-1 . . . 164-3 (164 generally) from each of the transformations encountered. The builder 162 includes a confidence builder 163 and a quality group builder 165, discussed further below in FIGS. 8 and 9, respectively. The confidence builder 163 defines logic for aggregating the component confidences and deriving a final confidence value for each extracted data items 151. Based on the final confidence values, the quality group builder 165 segregates the extracted data items 151 into different groups, or bins, that will be subjected to appropriate subsequent validation. The data capture server 110 builds a confidence model 152' from the component confidences 164 and match indicator 153. This model may be further refined to repetitive learning phases to deliver higher accuracy of extracted data 151 and thus ensuring it is ready for the production phase 170.

Upon completion of the learning phase 160, the confidence model 152 is employed in the production phase 170 for application to extract data from documents 115. Each of the transformations 166 results in an intermediate transformed data item 172. After all transformations are completed, the final extracted data item 130 is derived along with the corresponding confidence value 132 using the confidence model 152. The extracted data item 130 and corresponding confidence 132 are then stored in the repository 120.

Figure 2:
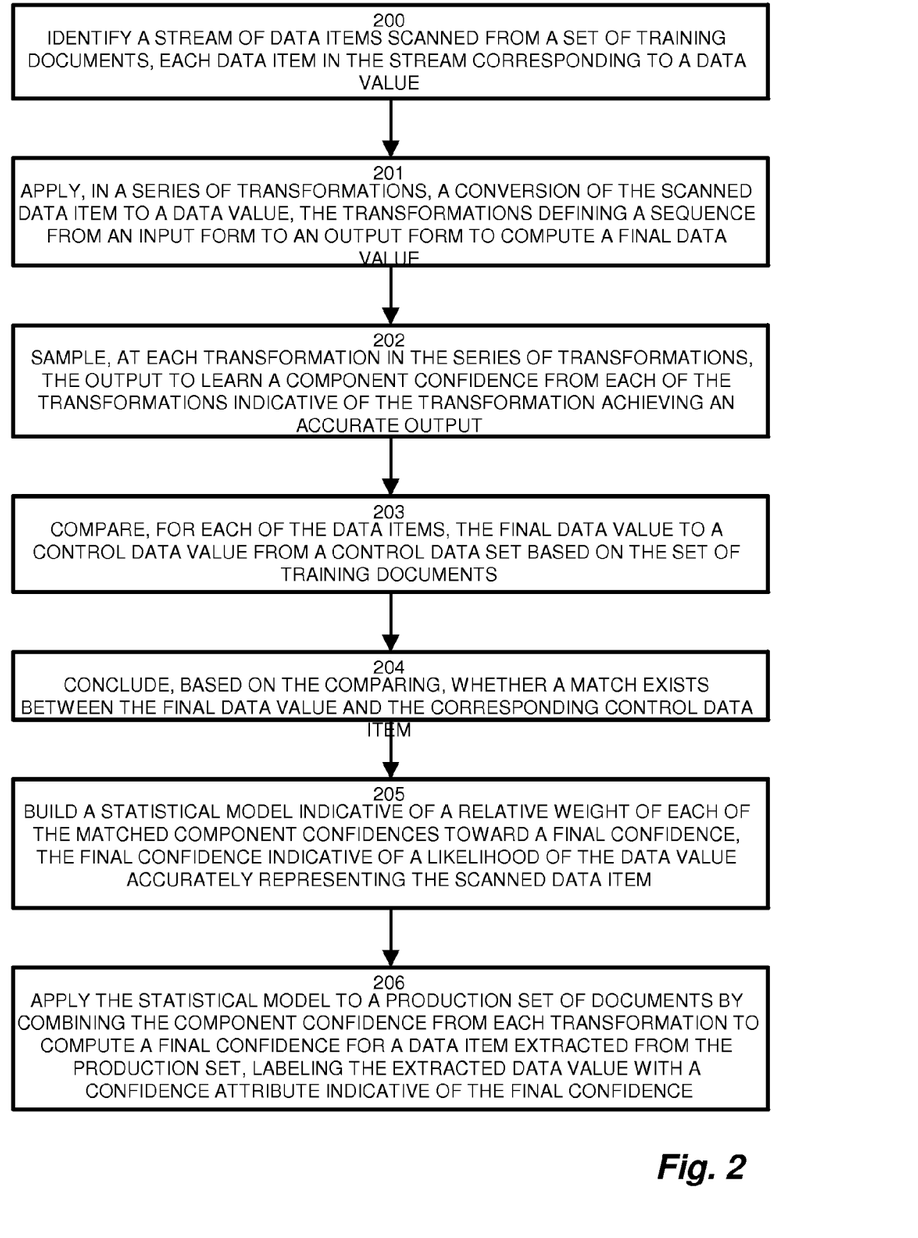
FIG. 2 is a flowchart of data extraction in the environment of FIG. 1.

FIG. 2 is a flowchart of data extraction in the environment of FIG. 1. Referring to FIGS. 1 and 2, in a data entry environment 100 having a set of documents 115 receivable as a stream of data 150 responsive to automated data extraction, the method for evaluating confidence of an extracted data value 150-1 as disclosed herein includes, at step 200, identifying, from the set of training documents 115-1.115-3 (115 generally), the stream of data items 150, in which the data items 150 are scanned as embedded fields 140 from the training documents 115 such that each data item 150 corresponds to a data value 151. The data capture server 110 employs any suitable scanning, optical recognition, or video based input mechanism, and applies, in a series of transformations 166'-1 ... 166'-3, a conversion of the data item to a data value 151, as depicted at step 201. The transformations 166'-1 ... 166'-3 (166 generally) define a sequence from an input form to an output form, in which an output of each transformation 166'-N provides input to the next transformation 166-N+1 in the sequence, such that the output of a last transformation (166'-3 in the example shown) in the sequence defining a final data value 151. Therefore, the data capture server 110 receives (scans) embedded fields 140 to provide data items 150 to transformations 166 to generate data values (151 in a learning phase 160, 172 during the production phase 170, discussed further below).

The builder 162 samples, at each transformation 166' in the series of transformations 166'-N, the output to determine a confidence indicative of the transformation achieving an accurate output, as depicted at step 202, and learns, from the sampled output, a component confidence (164, FIG. 4 below) obtained from each of the transformations 166'. Sampling and learning may include reading back the transformed data item for comparison, or other mechanism for deriving a statistical likelihood of the transformation recognizing the input and generating the output representative of the same data item 150. Following each of the transformations 166'-N of a data item 150, comparison is made for each of the data items 150-N, the final data value 151 to a control data value 142 from a control data set based on the set of training documents 115, as depicted at step 203. Based on the comparison, whether a match 153 exists between the final data value 151 and the corresponding control data item 142, the confidence value generated by confidence builder 163 is accepted as shown at step 204.

Based on a generated set of final data values 151 and corresponding control values 142, the confidence builder builds a statistical model, or confidence model 152', indicative of a relative weight of each of the matched component confidences 164 toward a final confidence, such that the final confidence is indicative of a likelihood of the data value 151 accurately representing the scanned data item 150-1, as depicted at step 205.

Once the training phase 160 is complete with a representative set of training documents, the data capture server 110 applies the statistical confidence model 152 to a production phase on a fresh set of documents (125 in FIG. 4, below) having a similar format as the set of training documents, as in step 206. The extracted data items 130 derived after multiple transformations along with the final confidence attribute 132 are then stored in the repository 120 via the DB interface 116.

Figure 3:
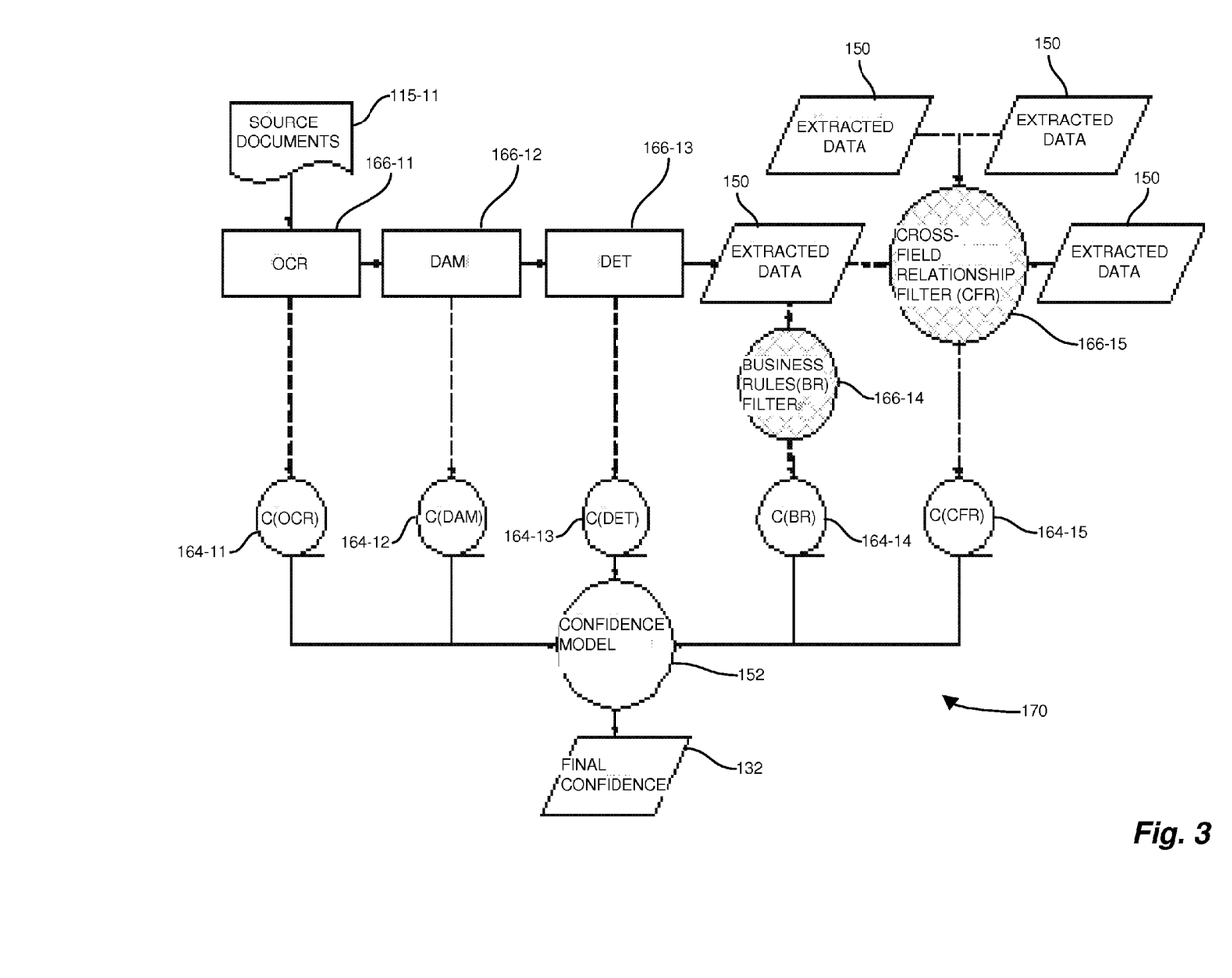
FIG. 3 is a data flow diagram of component confidences employed according to FIG. 2.

FIG. 3 is a data flow diagram of component confidences 164 employed according to FIG. 2. Referring to FIG. 3, a particular configuration of the production phase 170 is shown using component confidences 164-11 ... 164-15. Configurations herein employ a selection of extraction technology (technology) as performed by computing and scanning devices, for building a system which will supplement human operation of data entry. An implementation of data capture from source documents using technology is shown as transformation modules 166-11 ... 166-15 for implementing the various transformations 166. Each of these modules 166 delivers a measure that correlates to the probability of the deliverable data being correct; accordingly each such measure is named as a component confidence. An OCR (Optical Character Recognition) transformation receives source image documents 115-11, typically raw printed data. Optionally, received documents may already be in a text format for which OCR need not be applied. Optical character recognition (OCR) is performed on the scanned images (image document) to convert the image document to its textual equivalent (textual document) by OCR Module 166-11; the resulting confidence component is C(OCR) 164-11. A rule based and/or machine learning based engine identifies and isolates the data elements available in the textual document via a data Annotation and Mark-up (DAM) module 166-12; the corresponding confidence component is C(DAM) 164-12. A data extraction, consolidation, and transformation module captures the isolated data elements and creates probable data via the Data Extraction (DE) Module 166-13; the resulting confidence component is C(DET) 164-13. A set of business rules performs a sanity check on the probable data, such that appropriate and relevant further transformation lead to generation of deliverable data via a business rule module 166-14; the confidence component is named C(BR) 164-14. Inter data field consistency is checked on the deliverable data by a Cross Field Relation (CFR) module 166-15; the confidence component is C(CFR) 164-15. Since the cross field relation module 166-15 verifies relations between multiple fields, other extracted data 150 from the same or similar documents may be employed. For example, as shown in an example document 115-2 in FIG. 1, a payment field 140 should reflect the difference between the (old) balance and the new balance 140, shown in further detail below in FIG. 4. Other rules may be derived based on dependencies between the data in the source documents 115 or other relevant input.

Implementation of the confidence model 152 occurs is as follows: (1) Each confidence component 164 is independently collected from the respective modules 166; and (2) the confidence components are aggregated using a pre-defined non-linear mechanism to derive a real score in the range of [0-1] to yield a final confidence score 132.

Figure 4:
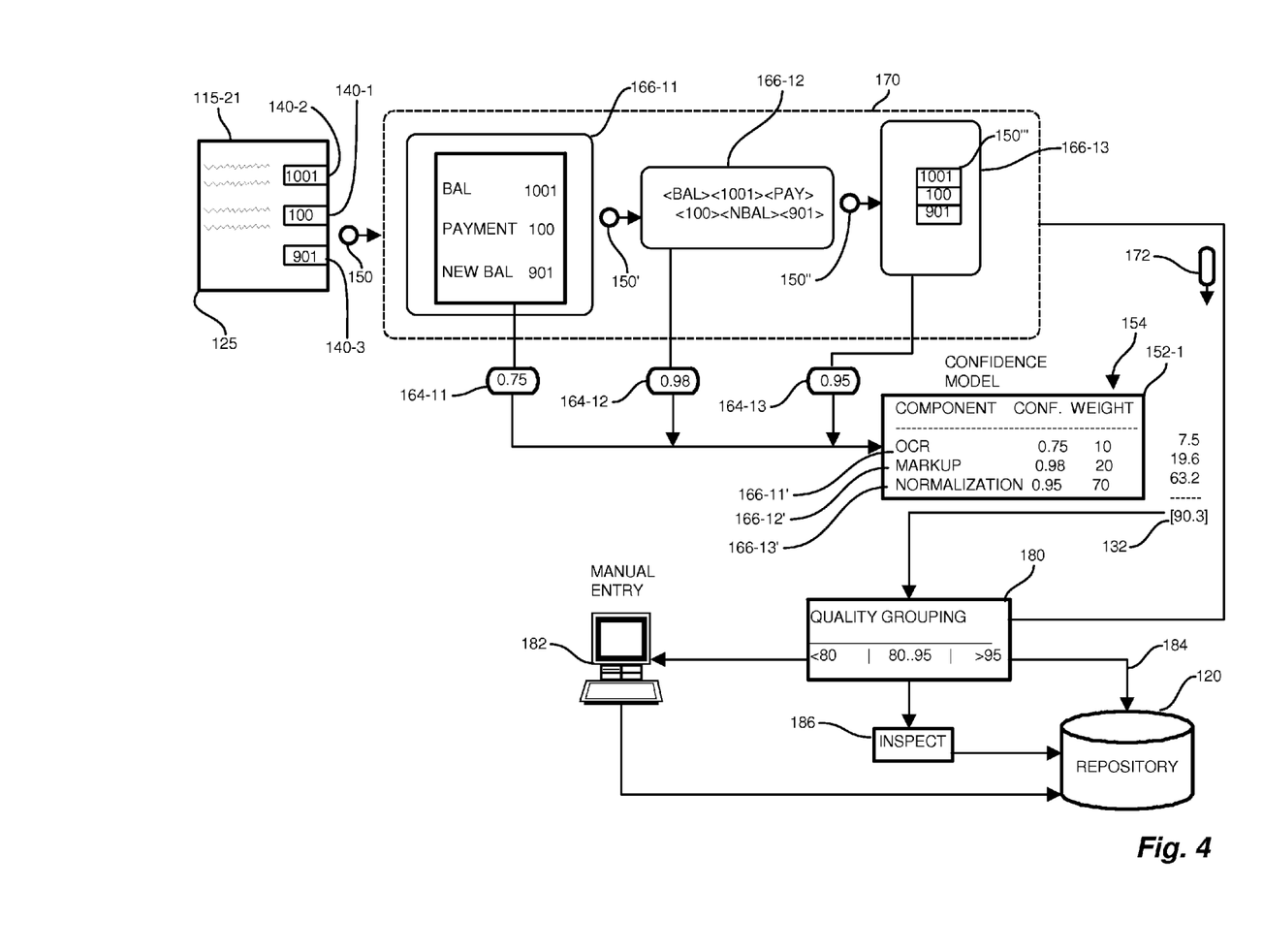
FIG. 4 is a block diagram of data extraction using component confidences as in FIG. 3.

FIG. 4 is a block diagram of data extraction using component confidences 164 as in FIG. 3. Referring to FIGS. 1 and 4, a production phase 170 document 115-21 of a form type has embedded fields for balance 140-1, payment 140-2 and new (net) balance 140-3. Three transformations occur to the embedded fields 140, including an OCR transformation 166-11, an annotated text scan 166-12, and a normalized field retrieval 166-13, in which the fields have been identified and values assigned, similar to a database lookup. The OCR scan 166-11 identifies the embedded fields 140 for "BAL 1001", "PAYMENT 100" and "NEW BAL 901." In the indicated example, The corresponding component confidence 164-11 for the OCR scan 166-11 is 0.75. The annotated text markup transformation 166-12 generates, from the OCR output a string of field delimited values to identify a field label for each of the data items 150'. The annotated text markup transformation 166-12 has a component confidence 164-12 of 0.98, and the successive transformation 166-13 receives the output data items 150". The normalized field transformation 166-13 identifies and retrieves the fields from the annotated text 150", and generates a normalized record 150''' of the embedded fields 140 as a set of ordered fields as the extracted data item 151. A component confidence 164-3 of 0.95 applies to the normalized field transformation.

A confidence model 152-1, generated from a previous learning phase 160, applies a relative weight to each of the component confidences 164-11 . . . 164-13. Each of the component confidences 164 receives a non-linear weighting, meaning that each is independently weighted from the component confidences of other transformations 166 toward generating a final transformation score. Other weighting arrangements may be employed. In the example shown, the confidence model 152-1 has a weighting factor 154 of 10 for the OCR transformation 166-11', 20 for the text markup transformation 166-12' and 70 for the field normalization transformation 166-13'. Multiplication of the component confidences by the respective weighting factors yields a final confidence 132 representative of all component confidences 164 as weighted by the confidence model 152.

The final confidence 132, in the example arrangement, undergoes a second qualification for quality grouping. The quality grouping identifies subsequent validation and checks appropriate for the extracted data item 151 based on the sensitivity of the operation and an acceptable deviation. The example quality grouping indicates that for a final confidence of less than 80, manual entry 182 of the data item 140 is to be performed for entry into the repository 120. A final confidence greater than 95 is permitted automatic entry 184 of the data item 130 and confidence attribute 132, while confidences in the range of 80-95 are afforded periodic or random inspections 186 to confirm accuracy, possibly resulting in manual entry for identified inaccuracies.

Figure 5:
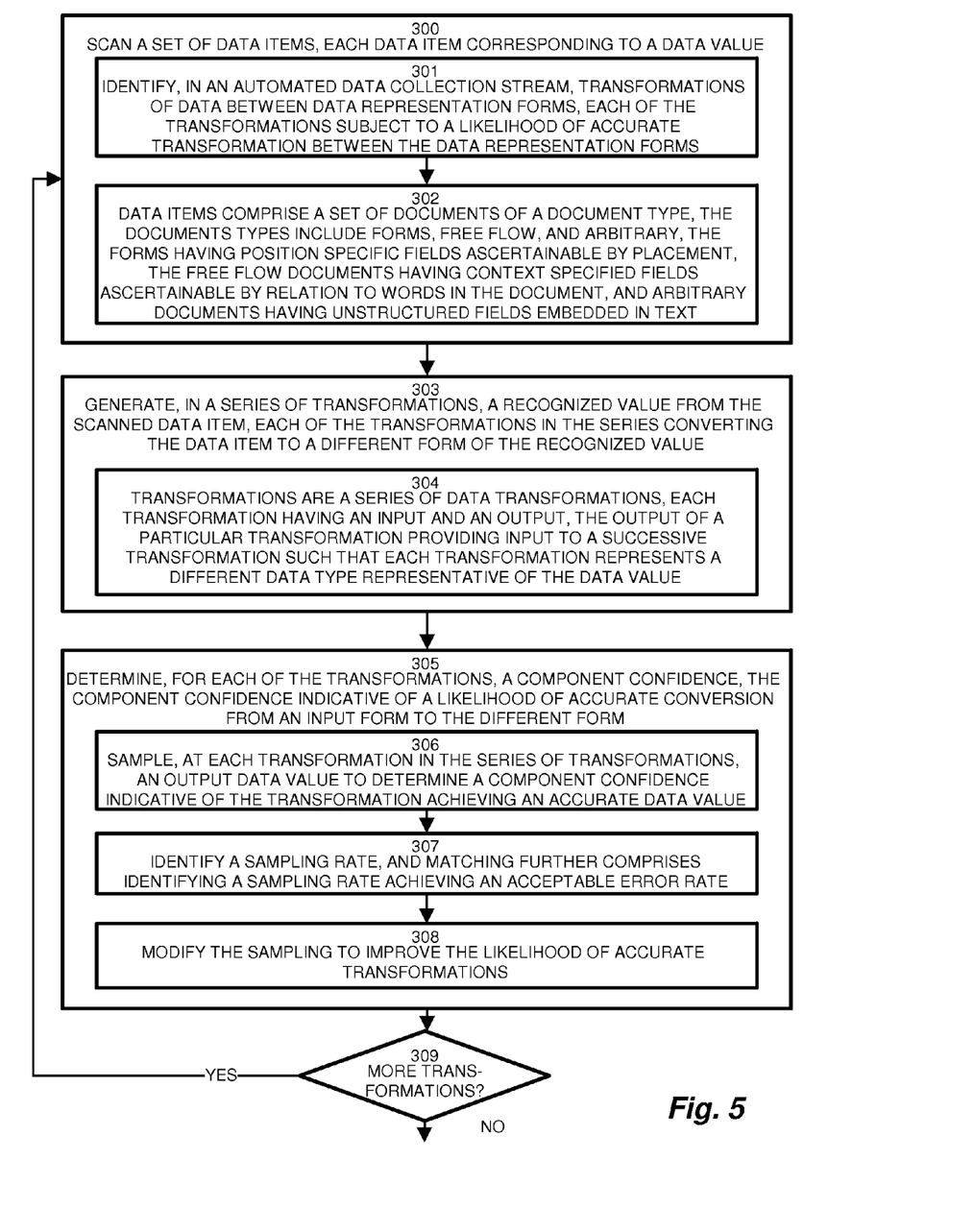
FIGS. 5-7 are a flowchart of confidence model learning and deployment in the environment of FIG. 1.
Figure 6:
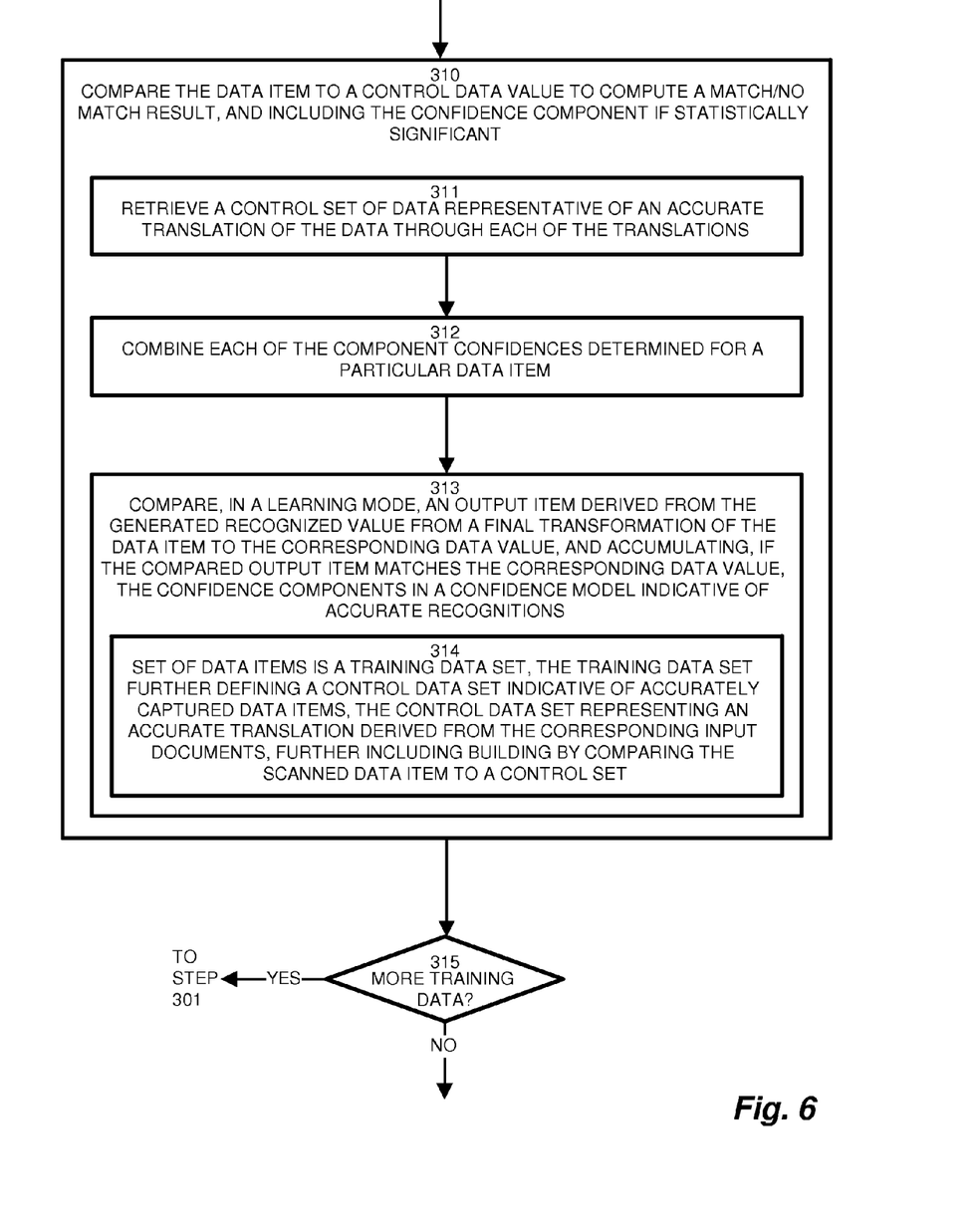
Figure 7:
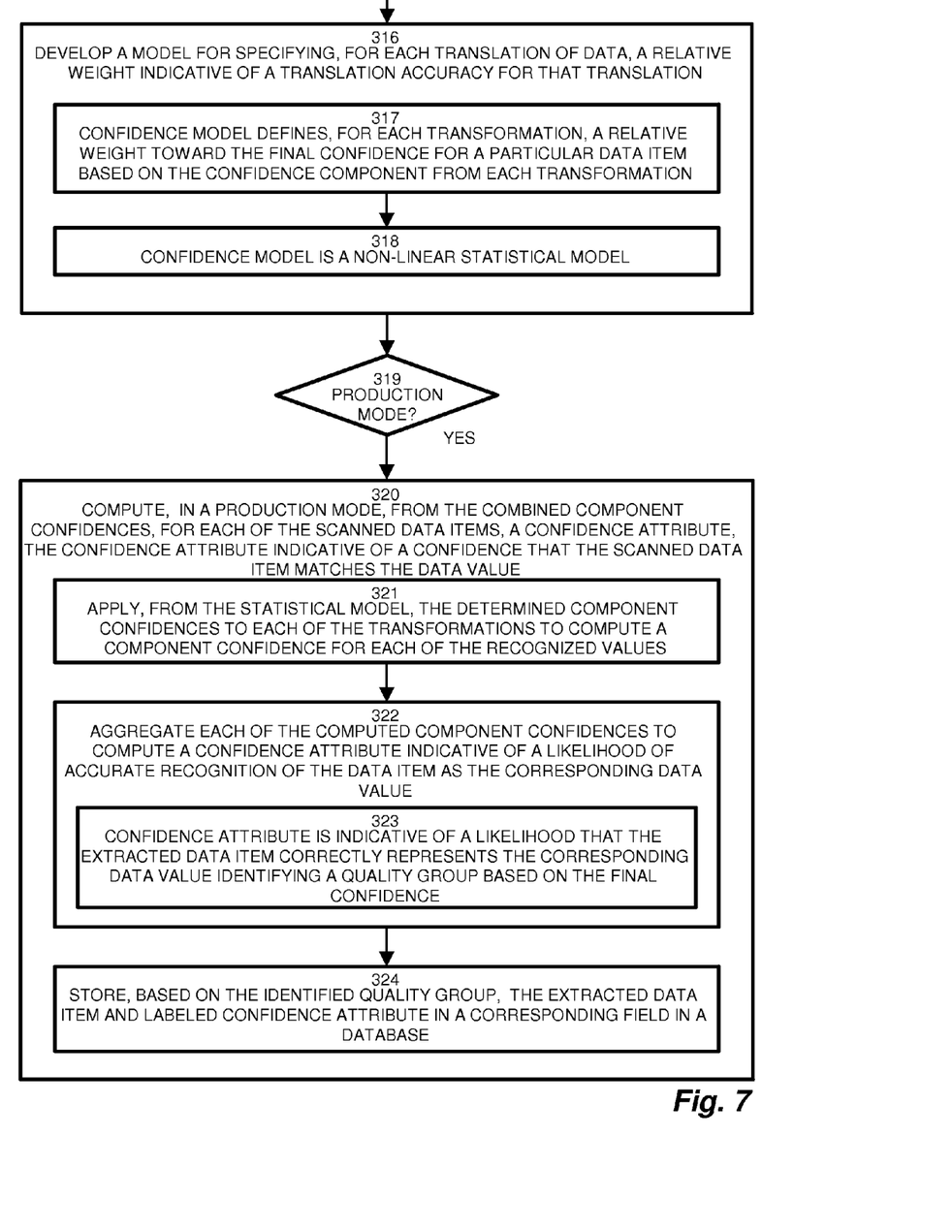

FIGS. 5-7 are a flowchart of confidence model learning and deployment in the environment of FIG. 1. Referring to FIGS. 1 and 4-7, prior to automated data extraction operations, a training data set similar to the documents to be used in production is received. The training data set 142 emulates the documents expected to be received in the production phase for identification of embedded data fields 140 as distinguished from other aspects of the document, such as graphics, heading, and extraneous text. In the automated data extraction environment 100, the data capture server 110, typically employing a non-transitory computer readable storage medium having instructions that when executed by a processor responsive to the instructions, performs a method of generating a confidence attribute 132 by scanning a set of data items 150, in which each data item 150-N corresponds to a data value 151, as depicted at step 300. Initially, the training data set 142 is employed for the learning phase 160, in which learning further includes identifying, in an automated data collection stream 150-N, transformations of data between data representation forms, such that each of the transformations 166' is subject to a likelihood of accurate transformation between the data representation forms, as disclosed at step 301. In the example arrangement shown, the data items 150 comprise a set of documents 115 of a document type, such that the documents types include forms 115-1, free flow 115-2, and arbitrary 115-3, in which the tabular forms 115-1 have position specific fields 140 ascertainable by placement, the form documents 115-2 have context specified fields 140 ascertainable by relation to words in the document, and the free flow, or arbitrary documents 115-3 have unstructured fields 140 embedded in text, as shown at step 302.

The data capture server 110 generates, in a series of transformations 166', a recognized value from the scanned data item 150, each of the transformations in the series converting the data item to a different form of the recognized value, as depicted at step 303. The transformations 166' are a series of data transformations 166'-N, such that each transformation 166' has an input and an output, in which the output of a particular transformation 166'-N provides input to a successive transformation 166'-(N+1), as shown at step 304. Each transformation 166' represents a different data type, or intermediary value in the series of transformations from raw document data to an extracted value, representative of the data value. The transformations are therefore a series of computable operations performed on the raw data in a stepwise manner to derive the corresponding data value, such as a numerical dollar value corresponding to a printed line item field 140, for example.

The builder 162 determines, for each of the transformations 166', a component confidence 164, such that the component confidence is indicative of a likelihood of accurate conversion from an input form to the different form provided by the transformation, as shown at step 305. The component confidence 164 therefore recognizes that some transformations may be more reliable than others in fidelity of reproduction. The confidence builder 163 samples, at each transformation 166' in the series of transformations 166'-1.166'-3, an output data value to determine the component confidence 164 indicative of the transformation 166' achieving an accurate data value, as depicted at step 306. Sampling includes identifying a sampling rate, and matching further comprises identifying a sampling rate achieving an acceptable error rate, or other suitable means of comparing an expected output from the transformation 166', as depicted at step 307. The learning phase 160 may modify the sampling to improve the likelihood of accurate transformations, as shown at step 308. For a particular data item, a check is performed to identify successive transformations, as depicted at step 309.

Once the series of transformations 166' is complete for a particular data item 151, the confidence builder 163 compares the data item 151 to a control data value 142 to compute a match/no match result, and includes the confidence component 164 if it is statistically significant, as disclosed at step 310. The confidence component is statistically significant if it sufficiently impacts a correlation of the match result to the accuracy of the final confidence, meaning that the confidence component adequately contributes to the likelihood of an accurate transformation. The builder 162 retrieves a corresponding control data item from a control set 142 of data representative of an accurate translation of the data after completion of the transformations 166', as depicted at step 311. The confidence builder 163 combines each of the component confidences 164 determined for a particular data item 151, as shown at step 312, and compares an output item derived from the generated recognized value from a final transformation of the data item 151 to the corresponding data value (from control data set 142). The confidence builder 163 accumulates, if the compared output item matches the corresponding data value, the confidence components 164 in a confidence model 152' indicative of accurate recognitions, as disclosed at step 313. In the example shown, the set of data items 115-21 is a training data set, such that the training data set further defines a control data set 142 indicative of accurately captured data items, in which that the control data set 142 represents an accurate translation derived from the corresponding input documents. From the transformation output, the confidence builder builds the confidence model 152 by comparing the scanned data item 151 to the control set 142, as depicted at step 314. Control reverts to step 301 based on the check at step 315 until the training document set 115 is exhausted to complete the training, or learning phase 160.

Upon completion of the training document scanning, the confidence builder 163 develops a model 152' for specifying, for each transformation of data, a relative weight indicative of a translation accuracy for that transformation, as shown at step 316. The resulting confidence model 152' defines, for each transformation 166, a relative weight toward the final confidence 132 for a particular data item based on the confidence component 164 from each transformation 166, as depicted at step 317, such that the confidence model 152' is a non-linear statistical model, as shown at step 318. Once learned, the confidence model 152' is employed as a completed confidence model 152 in the production phase 170 for similar transformations 166-1.166-3 as the learning transformations 166'-1 ... 166'-3.

Upon receiving a set of production document set 125, at step 319, the data capture server 110 computes, in a production mode, from the combined component confidences 164, and for each of the scanned data items 150-2, a confidence attribute 132, such that the confidence attribute 132 is indicative of a confidence that the scanned data item 140-1 ... 140-3 matches the data value 151, as disclosed at step 320. This includes, at step 321, applying, from the confidence model 152, the determined component confidences to each of the transformations to compute a component confidence 164 for each of the recognized values 172, as shown at step 321. The data capture server 110 employs the previously generated confidence model 152 for aggregating each of the computed component confidences 164 to compute a confidence attribute 132 indicative of a likelihood of accurate recognition of the data item 130 as the corresponding data value 140, as depicted at step 322. The resulting confidence attribute 132 is indicative of a likelihood that the extracted data item 130 correctly represents the corresponding data value 140-N, as shown at step 323. The interface 116 stores, based on an identified quality group 180, the extracted data item 172 and labeled confidence attribute in a corresponding field in a database 120, as depicted at step 324.

Figure 8:
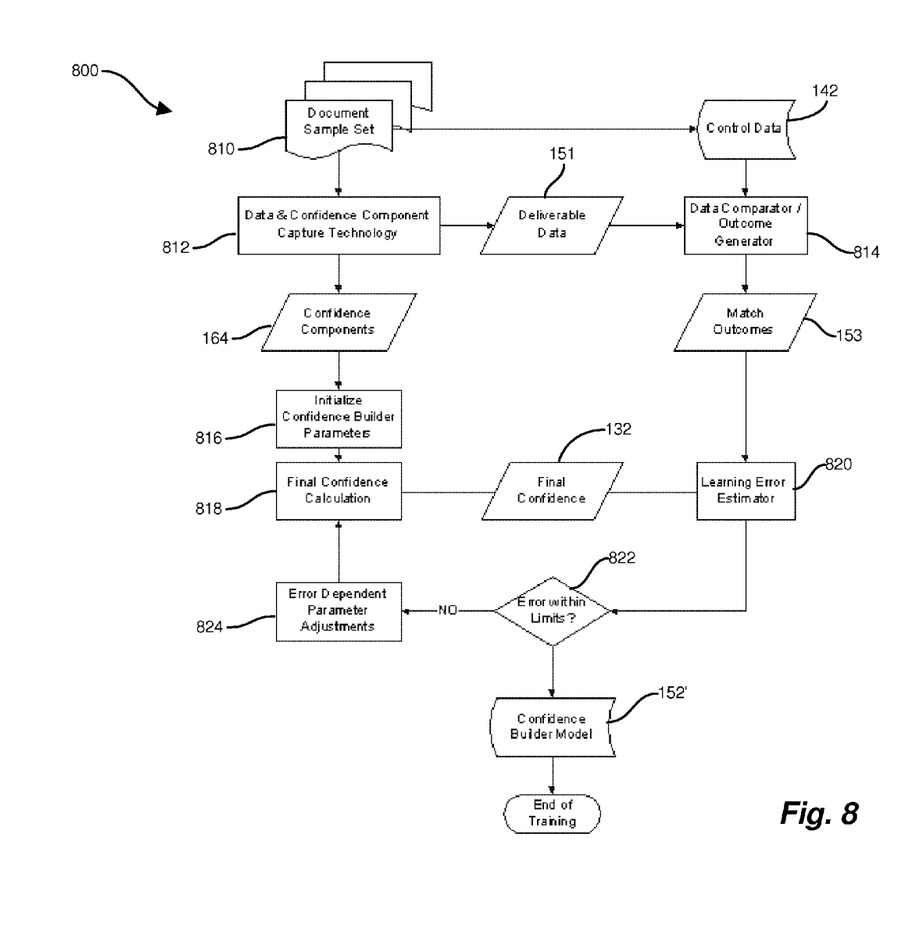
FIG. 8 is a flowchart of confidence model learning as in FIG. 1.

FIG. 8 is a detailed flowchart of confidence model learning as in FIG. 1. The confidence model 152' is trained for extraction of data values from a document sample set 810 and a corresponding control data set 142 indicative of the true values of embedded data items 140 (refer FIG. 1) for capture. The activities to be performed during the learning phase include collection of sample documents 810 and corresponding control data 142, i.e., data qualified as absolutely correct and appropriate; data capture from such documents with specifications for data transformation; generating at least one measure of probability score or confidence that may correlate to the accuracy of task performed for each data element capture; and comparing the data captured using technology against the control data—to decide for a match or mismatch against the control data. The result is learning of the non-linear learning mechanism to generate a statistical model 152' that aids final confidence evaluation.

An example implementation of the confidence builder learning phase is as follows: Upon document set 810, data extraction process with appropriate transformations is applied to result in the deliverable data 151 along with corresponding component confidence attributes 164. Comparison of each data item 151 with the corresponding control data value 142 yields an outcome signifying either as match (labeled as 1) or mismatch (labeled as 0). For each data element 150, a correlation study of each individual confidence component 164-1 ... 164-N with the outcome 153 reveals the statistical significance of the component. If the confidence component 164 is found to be statistically significant, it is used for training purpose.

The statistically significant components are fed as input to the non-linear trainable model to initialize the confidence builder parameters (816) while the outcomes act as targets. Subsequent iteration leads to fine-tuning the parameters of the non-linear model, as shown at step 824, so as to deliver confidences 132 that have a high correlation with the outcomes.

During each training iteration, a measure of difference (learning error 820) is evaluated while attempting to achieve a minimal error criterion. Once the predefined criteria is met, training is stopped and the evaluated parameters define the non-linear model for the confidence builder model 152', shown at step 822.

Figure 9:
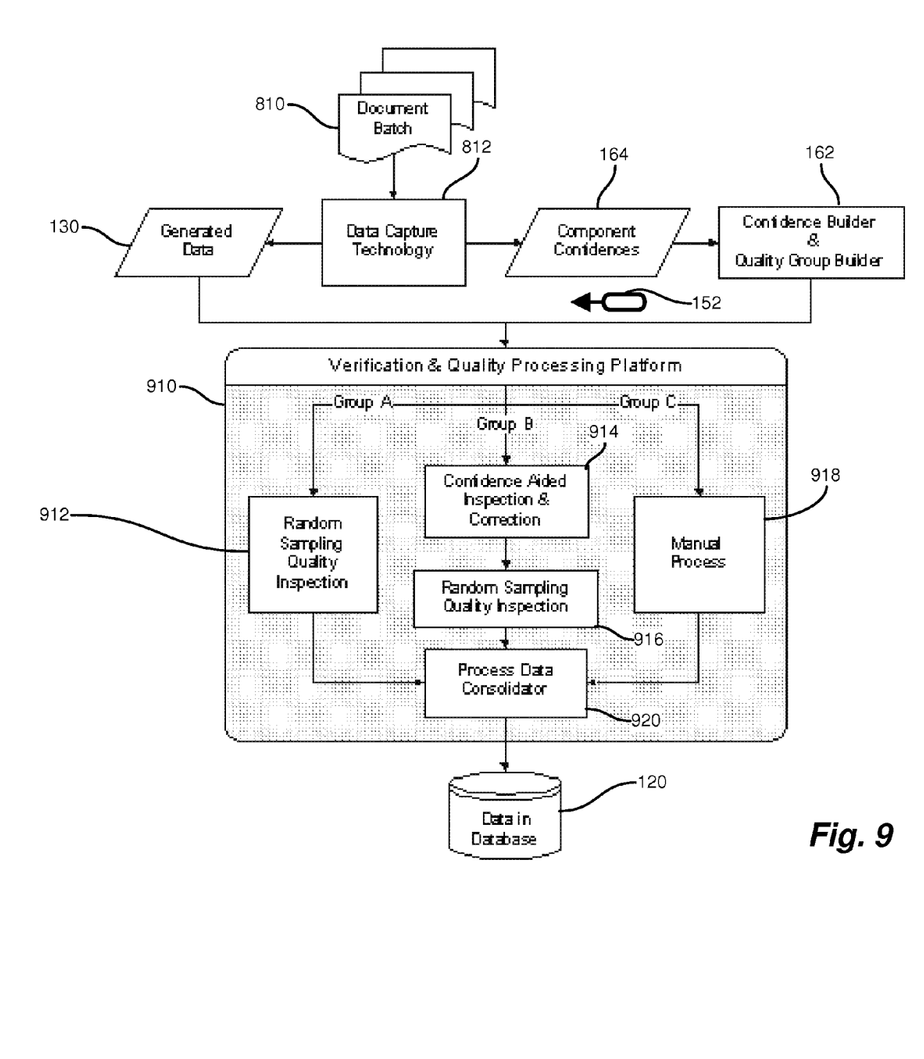
FIG. 9 is a flowchart of quality group deployment using the confidence model learned in FIG. 8.

FIG. 9 is a flowchart of the activities performed during an implementation into the Production Phase of a business process where the data extraction and confidence attribute generation automatically determine the life stages of a data element; the completion of these independent stages leads to delivery of the data into its storage platform/database:

1. Data extraction technology engine 812 generates the data 130 from source documents 810 along with its component confidence attributes 164.

2. The confidence attributes of the data are fed to the statistical confidence builder 162 to evaluate the final confidence for the captured data using the confidence model 152.

3. The evaluated final confidence is used to categorize the data to one of the predefined quality groups based on a frequency distribution study of the final confidence values for the generated data 130 The categorization is further enabled with input of the expected quality and tolerance limits manually specified and sensitized for business cost optimization.

4. The extraction technology driven data capture platform automatically determines the life stages of a data element; the completion of these independent stages leads to delivery of the data into its storage platform/database.

5. A verification and processing platform 910 arranges the data items 130 for subsequent disposition based on the appurtenant confidence value 132.

6. Depending on the context for which the captured data items are to be employed, tolerance for anomalies in the captured data may be varied, possibly by gauging the detriment of an inaccurate value against the resources required for manual validation and inspection of the extracted data items 130. In the example shown, captured data items 130 fall into one of three quality groups A, B and C based on the confidence level. The three groups define the level of trust indicative of the accuracy of extraction, and thus the subsequent processing, applied.

7. The quality group builder 162 performs grouping of the data based on the evaluated confidences to a predetermined set of categories; data in each category is evaluated and verified differently based on the confidence level 132. In the example shown, such categories are named as quality groups A, B and C. The builder 162 performs estimation of sampling rates for each defined category based on achieved accuracies to attain the desired quality level A, B or C. As disclosed in FIG. 8, sampling rates are modified by parameter adjustments 824 until sufficient as defined by the error check at step 822. Value ranges of the confidence level 132 are employed for determination of the data capture process flow that shall involve human efforts for verification and quality inspection.

An implementation of the training phase of the Quality Group Builder 162 is as follows. The verification and quality processing platform 910 collects the final confidence out of the trained confidence builder for each data value 150-2 The verification and quality processing platform 910 defines a list of categories and the functionality of each data category; the category functionality defines the life stages of a data element 172 when it gets assigned to the quality group. In the example arrangement, the quality group assignments result in the following:

a. Group 'A' data elements shall directly go to the storage database b. Group 'B' data elements shall be 100% inspected and 30% quality processed c. Group 'C' data elements shall be manually recaptured Categories (quality groups) may be fine tuned by conducting a frequency distribution (histogram) study of the final confidence values for all deliverable data points; based on this study determine the category boundary values (i.e. which confidence levels 132 belong in groups A, B and C). Business model parameters may be employed to declare the expected quality level and tolerance limits, and also used to estimate the business cost associated with such a category definition while meeting the expected quality level. Streamlining the quality groups may involve iterating through the sampling parameters, category boundaries, process definitions (subject to the meeting of the expected quality level within tolerance limits) to optimize the business costs.

The quality groups A, B and C therefore denote a bin structure indicating subsequent processing to be performed. Thus, the groups, in effect, assign a "trust" level to the extracted data to indicate, based on the context in which the data is to be used, if it is "safe" to enter directly into the database, and if not, what scrutiny to apply. At group A 912, the data is generally taken as extracted with 100% accuracy and need undergo only random quality inspections. Group B undergoes confidence aided inspection and correction, as shown at step 914. In the example configuration, group B may be 100% inspected and 30% quality processed, followed by similar random inspection as group A at 916. Group C represents the lowest tier of trust and invokes manual process 918 inspection and reentry for extracted items 130. A process data consolidator 920 reconciles the extracted data 130 with any reentered data items. The reconciled data considered as accurate and of highest quality is then populated into the database 120 thus making it available for appropriate future business use.

Those skilled in the art should readily appreciate that the programs and methods for generating a data extraction confidence attribute as defined herein are deliverable to a user processing and rendering device in many forms, including but not limited to a) information permanently stored on non-writeable storage media such as ROM devices, b) information alterably stored on writeable non-transitory storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method of generating a data extraction confidence attribute has been particularly shown and described with references to embodiments thereof, it will be understood by those skilled in the art that various changes in form and details may be made therein without departing from the scope of the invention encompassed by the appended claims.

What is claimed is:

1. In a data entry environment having a set of documents receivable as a stream of data responsive to automated data extraction, a non-transitory computer readable storage medium having instructions that when executed by a processor responsive to the instructions, perform a method for extracting a business relevant data value and evaluating a confidence value comprising:
   identifying a stream of data items scanned from a set of training documents, each data item in the stream corresponding to a data value;
   applying, in a series of transformations, a conversion of the scanned data item to the data value, the series of transformations defining a combined sequence from an input stream of data form to a final data value to convert the scanned data item to the data value, each transformation being a computation that transforms the input data form to an output form resulting in extraction of the final data value;
   deriving a component confidence from each of the transformations indicative of a likelihood of the transformation achieving an accurate output form;
   using each of the component confidences as an input to a statistical model that combines the component confidences in a weighted and non-linear manner to calculate a final confidence value corresponding to the final data value;
   using a sample set of input documents and control data corresponding to the sample documents as a training set to be used for a learning phase;
   comparing, in the learning phase, for each of the data items, the final data value to a control data value from a control data set based on the set of training documents;
   concluding, in the learning phase, based on the comparing, whether a match exists between the final data value and the corresponding control data item;
   adjusting the weights of the non-linear statistical model, in learning phase, based on the aforementioned match outcomes, so as to enable calculation of the final confidence indicative of a likelihood of the data value accurately representing the scanned data item;
   applying the series of transformations to a production set of documents for generation of data values and the statistical model to a production set of documents by combining the component confidence from each transformation to compute a final confidence for a data item extracted from the production set; and
   labeling the final data value having a confidence attribute, indicative of the final confidence, with a quality group.

2. The method of claim 1 further comprising, based on the quality group:
   applying a business process of inspection and validation on the data values belonging to a same quality group; and
   combining the outcomes of a series of business process applications on available quality groups for generation of high quality business relevant data values.

3. The method of claim 1 wherein the input data items comprise a set of documents of a document type, the documents types include forms, tabular, and arbitrary, the tabular documents having position specific fields ascertainable by placement, the forms documents having context specified fields ascertainable by relation to words in the document, and arbitrary documents having unstructured fields embedded in text.

4. The method of claim 2 wherein the transformations are a series of data transformations, each transformation having an input and an output, the output of a particular transformation providing input to a successive transformation such that each transformation represents a different data type representative of the data value.

5. In an automated data extraction environment, a non-transitory computer readable storage medium having instructions that when executed by a processor responsive to the instructions, perform a method of generating a confidence attribute comprising:

scanning a set of data items, each data item corresponding to a control data value;

generating, in a series of transformations, a recognized value from the scanned data item, the series of transformations defining a combined sequence from an input stream of data form to a final data value to convert the scanned data item to the recognized value, each of the transformations in the series converting the data item to a different form of the recognized value;

determining, for each of the transformations, a component confidence, the component confidence indicative of a likelihood of accurate conversion from an input form to the different form;

combining each of the component confidences determined for a particular data item in a weighted manner using a non-linear statistical model to generate a final confidence; and comparing, in a learning mode, the recognized value from a final transformation of the data item to the corresponding control data value, the recognized value defining a business relevant data value, the final confidence being indicative of the data value being a true representation of the original value in the input data stream.

6. The method of claim 5 wherein the transformations are synchronized in a serial and parallel manner for each data value, the transformations selected from the group consisting of transformations performing a unique and predefined task of transforming the input data to generate a different form of data named as output data;

transformations performing validating the output values of other transformations for the values compliant to various business related logic or relationship between the data values;

transformations performing their predefined tasks in a synchronized manner have an ability to transform the input document to a final deliverable data value;

transformations for splitting a data value to deliver two or more different output data values; and transformations for merging multiple outputs of other transformations to derive a single output data value, such that each step of transformation, in the process of transforming the input data to output data, generates a component confidence.

7. The method of claim 5 further comprising:

computing, the final confidence for each business relevant data value from the combined component confidence values derived from the transformations;

using, in the learning mode, the component confidence for calculation of the final confidence only if the component confidence is found to be statistically significant and favorably impacting the determination of the final confidence;

combining the component confidence with an associated weight determined during the learning mode; and computing the final confidence based on a non-linear statistical model including the associated weight, a the model being generated during the learning phase.

8. The method of claim 7 wherein the learning phase uses a training set including:

a sample set of documents representative of a business environment;

control data for each of the business relevant data items available in the sample set of documents, the control data being accurately representing the data that appears on the sample set of documents;

component confidences generated during the learning phase by the same series of transformations as to be used a production environment, wherein an extracted data value for each data item is present in the sample set of documents, further comprising performing a comparison between the extracted data value and the control data value resulting in a match or no match decision for each extracted data value; and making an association of the component confidences generated during the process of extraction of the data value with the match/no match decision.

9. The method of claim 7 wherein the learning phase further comprises a learning technique for:

providing an initial set of weight values and a list of methods for combining the weighted component confidences to generate a final confidence value;

using a learning mechanism to iteratively revise the weight values so as to reduce a quantified error of alignment of the final confidence with the match decision;

revising the weight values, in an iterative manner, until further revision either leads to non-reduction or increase of quantified error; and selecting a combination of the component confidences that makes maximum representation of the data value being accurately represented as available in the input data stream.

10. The method of claim 7 wherein learning phase further comprises:

analyzing a statistical distribution of the final confidence values corresponding to the data values of the training set;

determining thresholds based on an analysis performed to form quality groups;

assigning each final confidence value to one of the quality groups formed for the set of data values from which the final confidence value derives;

determining a business process of manual inspection and validation of the produced data for each of the quality groups;

determining a sampling percentage to be used for quality inspection in each quality group to match a final data quality percentage; and revising the thresholds for quality group formation and sampling percentages based on a business cost associated with each specific business process so as to meet a minimum cost criteria for achieving the final data quality percentage.

11. The method of claim 6 wherein computing the final confidence from the statistically significant and favorably impacting component confidences, associated weights and the non-linear statistical model, in a production mode, further comprises employing an automated data extraction mechanism to deliver data value and final confidence by:

using the series of transformations on a batch of production input data streams to compute systematically the output data value;

deriving, from each of the transformations, the component confidence;

combining the statistically significant component confidences with the corresponding associated weights; and using both the selected component confidences and the associated weights in the non-linear statistical model to determine a final confidence.

12. The method of claim 9 wherein sampling percentage includes identifying a sampling rate, and matching further comprises identifying a sampling rate achieving an acceptable error rate.

13. The method of claim 5 further comprising computing, in a production mode, from the combined component confidences, for each of the scanned data items, a confidence attribute, the confidence attribute indicative of a confidence that the scanned data item matches the data value.

14. The method of claim 13 further comprising:
    applying, from the confidence model, the determined component confidences to each of the transformations to compute a component confidence for each of the recognized values, and
    aggregating each of the computed component confidences to compute a confidence attribute indicative of a likelihood of accurate recognition of the data item as the corresponding data value.

15. The method of claim 13 wherein the confidence attribute is indicative of a likelihood that the extracted data item correctly represents the corresponding data value identifying a quality group based on the final confidence, further comprising storing, based on the identified quality group, the extracted data item and labeled confidence attribute in a corresponding field in a database.

16. The method of 13 wherein the data items comprise a set of documents of a document type, the documents types include forms, tabular, and arbitrary, the tabular documents having position specific fields ascertainable by placement, the forms documents having context specified fields ascertainable by relation to words in the document, and arbitrary documents having unstructured fields embedded in text.

17. The method of 15 wherein the learning mode further comprises:
    sampling, at each transformation in the series of transformations, an output data value to determine a component confidence indicative of the transformation achieving an accurate data value;
    modifying the sampling to improve the likelihood of accurate transformations; and
    comparing the data item to a control data value to compute a match/no match result and including the confidence component if statistically significant, sampling including identifying a sampling rate, and matching further comprising identifying a sampling rate achieving an acceptable error rate.

18. The method of claim 5 wherein the confidence model defines, for each transformation, a relative weight toward the final confidence for a particular data item based on the confidence component from each transformation.

19. The method of claim 5 wherein the set of data items is a training data set, the training data set further defining a control data set indicative of accurately captured data items, the control data set representing an accurate translation derived from the corresponding input documents, further including building the confidence model by comparing the scanned data item to a control set.

20. The method of claim 19 wherein the transformations are 5 a series of data transformations, each transformation having an input and an output, the output of a particular transformation providing input to a successive transformation such that each transformation represents a different data type representative of the data value.

21. The method of claim 5 further comprising:
    identifying, in an automated data collection stream, transformations of data between data representation forms, each of the transformations subject to a likelihood of accurate transformation between the data representation forms;
    receiving a training data set;
    retrieving a control set of data representative of an accurate translation of the data through each of the transformations; and
    developing a confidence model for specifying, for each translation of data, a relative weight indicative of an accuracy for that transformation.

22. An automated data capture server, comprising:
    an interface for scanning a set of data items, each data item corresponding to a data value;
    a plurality of transformations applied in a series for generating recognized value from the scanned data item, the transformations defining a combined sequence from an input stream of data form to a final data value to convert the scanned data item to the recognized value, each of the transformations in the series converting the data item to a different form of the recognized value;
    a builder for determining, for each of the transformations, a component confidence, the component confidence indicative of a likelihood of accurate conversion from an input form to the different form;
    a confidence builder for combining each of the component confidences determined for a particular data item, and comparing, in a learning mode, the recognized value from a final transformation of the data item to the corresponding data value; and
    a confidence model for accumulating, if the compared recognized value matches the corresponding data value, the confidence components in the confidence 5 model, the accumulated confidence components indicative of accurate recognitions.

23. The server of claim 22 wherein the data capture server is for computing, in a production mode, from the combined component confidences, for each of the scanned data items, a confidence attribute, the confidence attribute indicative of a confidence that the scanned data item matches the data value.

24. The server of claim 23 wherein the confidence model applies the determined component confidences to each of the transformations to compute a component confidence for each of the recognized values, and aggregates each of the computed component confidences to compute a confidence attribute indicative of a likelihood of accurate recognition of the data item as the corresponding data value.

25. The server of claim 23 wherein the confidence attribute is indicative of a likelihood that the extracted data item correctly represents the corresponding data value identifying a quality group based on the final confidence, further comprising:
    a database interface for storing, based on the identified quality group, the extracted data item and labeled confidence attribute in a corresponding field in a database.

26. The server of claim 23 wherein the transformations are a series of data transformations, each transformation having an input and an output, the output of a particular transformation providing input to a successive transformation such that each transformation represents a different data type representative of the data value.

27. The server of claim 22 wherein the data capture server is further operable to:
- identify, in an automated data collection stream, transformations of data between data representation forms, each of the transformations subject to a likelihood of accurate transformation between the data representation forms;
- receive a training data set;
- retrieve a control set of data representative of an accurate translation of the data through each of the transformations; and
- develop a confidence model for specifying, for each translation of data, a relative weight indicative of an accuracy for that transformation.

28. In a data entry environment having a set of documents receivable as a stream of data responsive to automated data extraction, a method for evaluating confidence of an automatically captured data value comprising:
- learning, from a set of input documents, component confidences of a data item, wherein the component confidences are based at least in part on a plurality of transformations applied in a series for generating a recognized value from the set of input documents, the transformations defining a combined sequence from an input stream of data to a final data value to convert a scanned data item to the recognized value;
- building a statistical model indicative of a relative weight of each of the component confidences toward a final confidence representative of each of the component confidences;
- labeling an extracted data item with a confidence attribute indicative of the final confidence; and
- storing the extracted data item and labeled confidence attribute in a corresponding field in a database.

* * * * *